United States Patent [19]
Takahashi et al.

[11] Patent Number: 5,668,720
[45] Date of Patent: Sep. 16, 1997

[54] AIR BAG CONTROLLING APPARATUS

[75] Inventors: Toshinori Takahashi, Konan; Jun Ito, Inazawa, both of Japan

[73] Assignee: Toyoda Gosei Co., Ltd., Aichi-ken, Japan

[21] Appl. No.: 428,326

[22] Filed: Apr. 25, 1995

[30] Foreign Application Priority Data

| Apr. 28, 1994 | [JP] | Japan | 6-113477 |
| Apr. 28, 1994 | [JP] | Japan | 6-113478 |
| Oct. 31, 1994 | [JP] | Japan | 6-292271 |
| Oct. 31, 1994 | [JP] | Japan | 6-292272 |
| Oct. 31, 1994 | [JP] | Japan | 6-292273 |
| Oct. 31, 1994 | [JP] | Japan | 6-292274 |

[51] Int. Cl.$^6$ .................................. B60R 21/32
[52] U.S. Cl. ..................... 701/46; 280/735; 180/282; 307/10.1
[58] Field of Search ................ 364/424.05; 180/271, 180/282, 268; 280/728.1, 734, 735; 340/436, 438; 307/10.1

[56] References Cited

U.S. PATENT DOCUMENTS

| 3,870,894 | 3/1975 | Brede et al. | 180/274 |
| 5,014,810 | 5/1991 | Mattes et al. | 180/268 |
| 5,149,127 | 9/1992 | Manabe et al. | 280/731 |
| 5,229,943 | 7/1993 | Eigler et al. | 364/424.05 |
| 5,262,949 | 11/1993 | Okano et al. | 364/424.05 |
| 5,382,049 | 1/1995 | Hiramitsu et al. | 280/735 |
| 5,431,441 | 7/1995 | Okano | 280/735 |
| 5,446,661 | 8/1995 | Gioutsos et al. | 364/424.05 |
| 5,490,069 | 2/1996 | Gioutsos et al. | 364/424.05 |

FOREIGN PATENT DOCUMENTS

| 3253441 | 11/1991 | Japan. |
| 4133840 | 5/1992 | Japan. |

*Primary Examiner*—Gary Chin
*Attorney, Agent, or Firm*—Cushman Darby & Cushman, IP Group of Pillsbury Madison & Sutro LLP

[57] ABSTRACT

A first velocity change value V1 is derived by integrating the deviation of a detected vehicle deceleration from a first deceleration reference value, e.g., 1 g, and a second velocity change value V2 is derived by integrating the deviation of the detected vehicle deceleration from a second deceleration reference value, e.g., 6 g. When the velocity change values V1 and V2 have reached a first velocity threshold value TH1 and a second velocity threshold value TH2, respectively, an inflator is ignited to make it discharge compressed gas into an air bag. When the time t elapsed since the first velocity change value V1 has become positive is within a first time reference value t1 and the first velocity change value V1 does not reach the first velocity threshold value TH1, a second velocity threshold value TH2 is Updated to become TH3. The second velocity threshold value TH3 thus updated is greater than the preceding threshold value TH2. In updating the second velocity threshold value TH2, the ratio of the first velocity change value V1 to the second velocity change value V2 is calculated. When this ratio has satisfied a predetermined condition K, the second velocity threshold value TH2 is updated.

17 Claims, 15 Drawing Sheets

AIR BAG CONTROLLING APPARATUS

BACKGROUND OF THE INVENTION

The present invention relates to an air-bag control apparatus for use in, for example, a motor vehicle and which is adapted to activate the air-bag at a satisfactory time to protect the driver and passengers during a collision.

In particular, the present invention relates to an apparatus for preventing an air-bag system from being activated by a low-velocity collision and for activating the air-bag system only at the time of a medium-velocity collision.

Conventionally, the air-bag system is activated at a time when a velocity change value obtained by integrating the deviation of the deceleration of a vehicle at the time of a collision from a predetermined threshold value has reached at least a predetermined value. The threshold value is taken as the origin. Deceleration above the threshold value is taken as a positive value (+), whereas deceleration below the threshold value is taken as a negative value (−). By thus performing a time-integral calculation, a velocity change value is derived.

Even at a low velocity (of approximately 15 km/hour), however, the velocity change value often becomes at least the predetermined value. Therefore, it is necessary to prevent activation of the air bag consequent to a low-velocity collision.

As solution thereto, JP-A-4-133840 describes a method of avoiding activation of the air bag system at a low velocity by raising the threshold value for the integral calculation of vehicle deceleration, and JP-A-3-253441 describes a method of avoiding activation of the air bag system at a low velocity by raising a predetermined value for the velocity change value after a fixed time has elapsed since the start of the calculation.

If the above described conventional techniques are used, however, the decision time of collision at the time of a collision with a medium velocity (of approximately 30 km/hour) is prolonged by raising the threshold value for the time-integration calculation of the vehicle deceleration. In addition, a change of the integral start time is increased by raising the predetermined value for the velocity change value when a fixed time has elapsed since the start of the calculation.

By appropriate design of the air bag and its electrically initiated inflator, therefore, these changes are accommodated. As a result, it takes time to manufacture the apparatus by way of empirical trials and time to make adjustments on the apparatus.

In recent years, the air bag system has been mounted not only on the driver's seat but on a passenger's seat, such as an assistant's seat. In this case, the air bag on the passenger's seat guards the passenger in cooperation with the restraint provided by a seat belt.

These two air bag systems are started at the same time and operate concurrently.

SUMMARY OF THE INVENTION

An object of the present invention is to provide an air-bag control apparatus capable of preventing activation of the air bag system consequent to a low-velocity collision and stabilizing the activation timing for a medium-velocity collision. By using this control apparatus, the time required for the design and manufacture by way of successive trial and adjustment of an air bag system is reduced. Furthermore, an air bag control apparatus suitable for the vehicle weight is provided.

In accordance with an aspect of the present invention, a first velocity change value V1 is derived by integrating the deviation of a detected vehicle deceleration from a first deceleration reference value, e.g., 1 g, and a second velocity change value V2 is derived by integrating the deviation of the detected vehicle deceleration from a second deceleration reference value, e.g., 6 g, in order to achieve the a-bore described object. When the velocity change values V1 and V2 have reached a first velocity threshold value TH1 and a second velocity threshold value TH2, respectively, an inflator is electrically ignited (i.e., initiated) to make it discharge compressed or inflation gas into an air bag. When the time t elapsed since the first velocity change value V1 has become positive is within a first time reference value t1 and the first velocity change value V1 does not reach the first velocity threshold value TH1, the second velocity threshold value TH2 is updated to become TH3. The second velocity threshold value TH3, thus updated, is greater than the preceding threshold value TH2.

In updating the second velocity threshold value, preferably the ratio of the first velocity change value V1 to the second velocity change value V2 is calculated and it is determined whether this ratio satisfies a predetermined condition K.

Another object of the present invention is to provide an air-bag control apparatus capable of effectively preventing false operation of an air bag system. For one thing, in case a deviation occurs in the offset voltage of a sensor for detecting the deceleration of a vehicle, i.e., an acceleration sensor, spurious activation of the air bag system is prevented.

In accordance with another aspect of the present invention, therefore, when the time t elapsed since the first velocity change value V1 has become positive and exceeds a second time reference value (e.g., 120 ms), operation of the inflator is prevented and the above described elapsed time t and the calculated first velocity change value V1 and the second velocity change value V2 are reset to their initial values.

Furthermore, in case a shock, such as hammerblow, is applied near an electric control unit (ECU) of the air bag system and abrupt deceleration is detected, operation of the air bag system is also prevented.

In accordance with another aspect of the present invention, therefore, operation of the inflator is prevented until the time t elapsed since the first velocity change value V1 has become positive and reaches a third time reference value t1 (e.g., 6 ms).

Furthermore, also in the case where a wire has backer in an acceleration sensor for detecting the deceleration of the vehicle, operation of the air bag system is prevented.

In accordance with still another object of the present invention, therefore, when the time t elapsed since the first velocity change value V1 has become positive is shorter than a fourth time reference value (xx+1, e.g., 2 ms) and the second velocity change value V2 has exceeded the second velocity threshold value TH2, the elapsed time t and the calculated first velocity change value V1 and second velocity change value V2 are reset to prevent operation of the inflator. Furthermore, when the steering wheel is pushed down by the driver, operation of the air bag is prevented.

In accordance with still another aspect of the present invention, when a deceleration value less than a third deceleration reference value (e.g., −2 g) has continued beyond a fifth time reference value (e.g., 7.5 ms), operation of the inflator is prevented and the elapsed time t, the first velocity change value V1, and the second velocity change value V2 are reset.

Another object of the present invention is to make the start time points of the respective air bag systems proper in case air bag systems are mounted on the driver's seat and the passenger's seat. Thereby the capacity of the air bags can be reduced.

In accordance with yet another aspect of the present invention, the air bag of the passenger's seat is inflated later than the air bag of the driver's seat by a delay time depending upon the collision state of the vehicle in order to achieve the above described object.

BRIEF DESCRIPTION OF THE DRAWING

These and other objects and the technical advantages of the present invention will be readily apparent from the following description of the preferred exemplary embodiments of the invention in conjunction with the accompanying drawings, in which.

DESCRIPTION OF THE PREFERRED EMBODIMENTS

Figure 1:
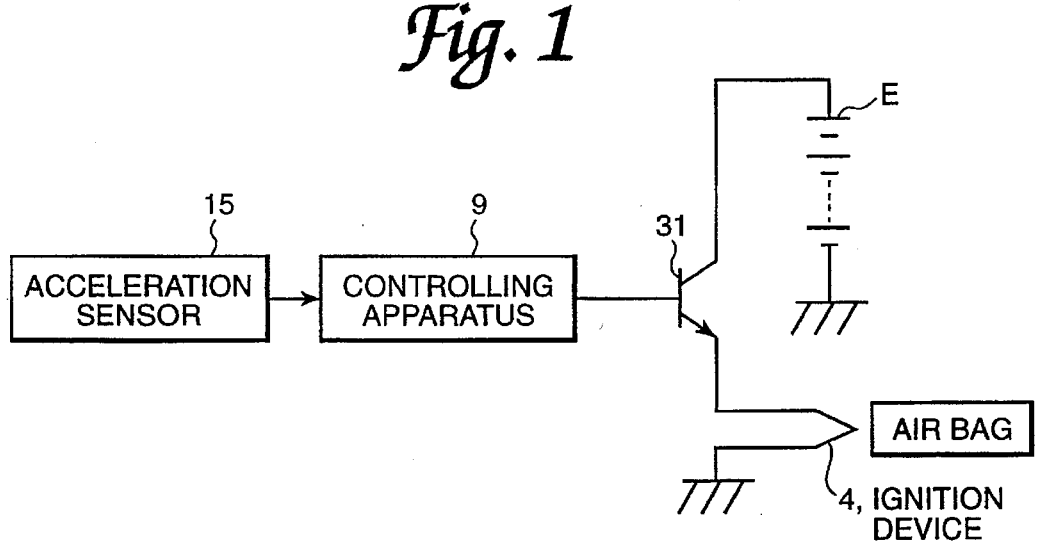
FIG. 1 is a diagram showing the configuration of a first embodiment of an air bag control apparatus according to the present invention.

FIG. 1 is a schematic diagram showing the configuration of a first embodiment.

An acceleration signal detected by an acceleration sensor 15 is inputted to an air bag control apparatus 9. The air bag control apparatus 9 executes calculations for the collision/no-collision decision. In case a collision is judged to have occurred, the air bag control apparatus 9 outputs a signal for electrically starting or initiating an inflator (not shown) to a switching transistor 31 connected in series with a voltage supply E and an ignition device 4 for the inflator. Once transistor 31 is biased into conduction, a current flows through the ignition device 4 and the inflator is initiated.

Figure 2:
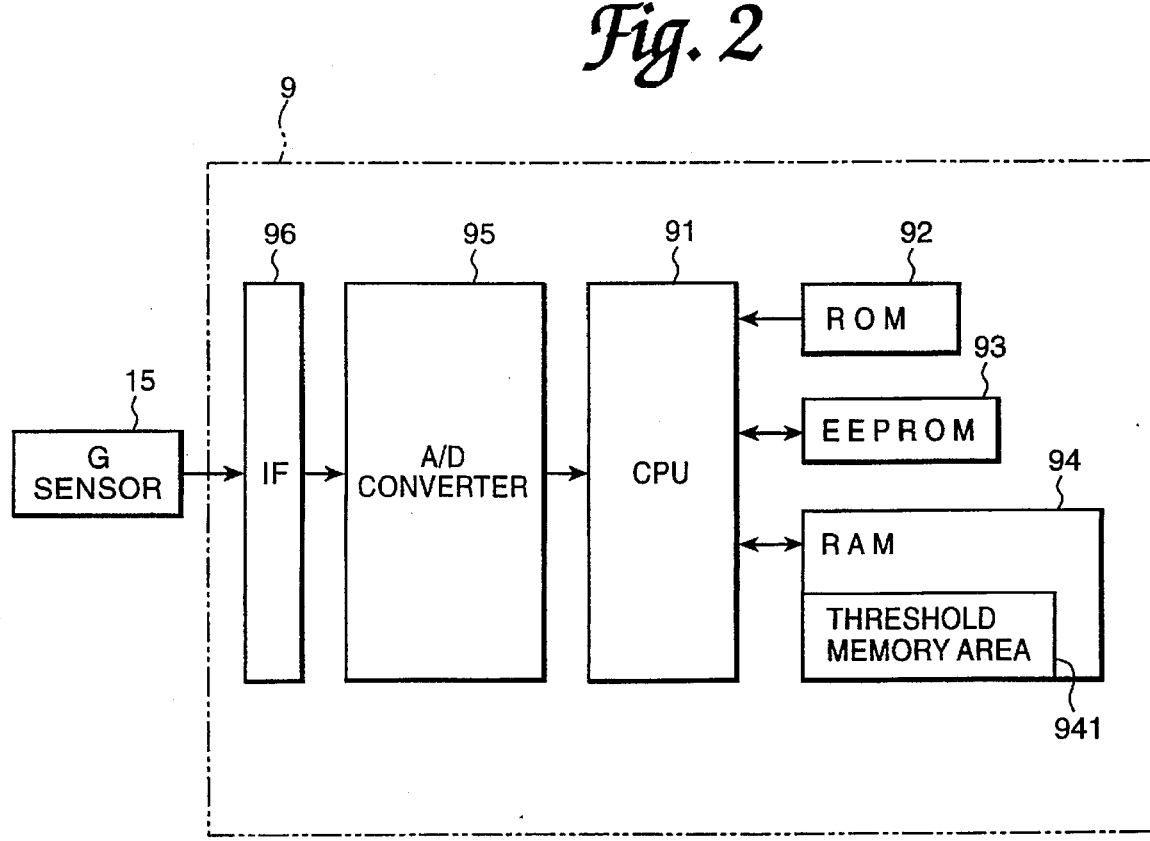
FIG. 2 is a detailed functional block diagram of the control apparatus of FIG. 1.

As shown in FIG. 2, the controlling apparatus includes a CPU 91, a ROM 92 storing a control program and a collision decision program, an EEPROM 93 that accepts write operation from the outside, a RAM 94 for storing various data, an A/D converter 95, and an interface (IF) 96.

In the RAM 94, a threshold memory area 941 is formed. The threshold memory area 941 stores threshold values for judging the moment in time to start the inflator so as to be associated with physical displacement values of the vehicle based upon a deceleration signal supplied from the acceleration sensor 15. The deceleration signal supplied from the acceleration sensor 15 is inputted to the CPU 91 via the interface 96 and the A/D converter 95. The actual configuration of the air bag system is disclosed in U.S. Pat. No. 5,382,049, which is incorporated herein by reference.

Figure 3:
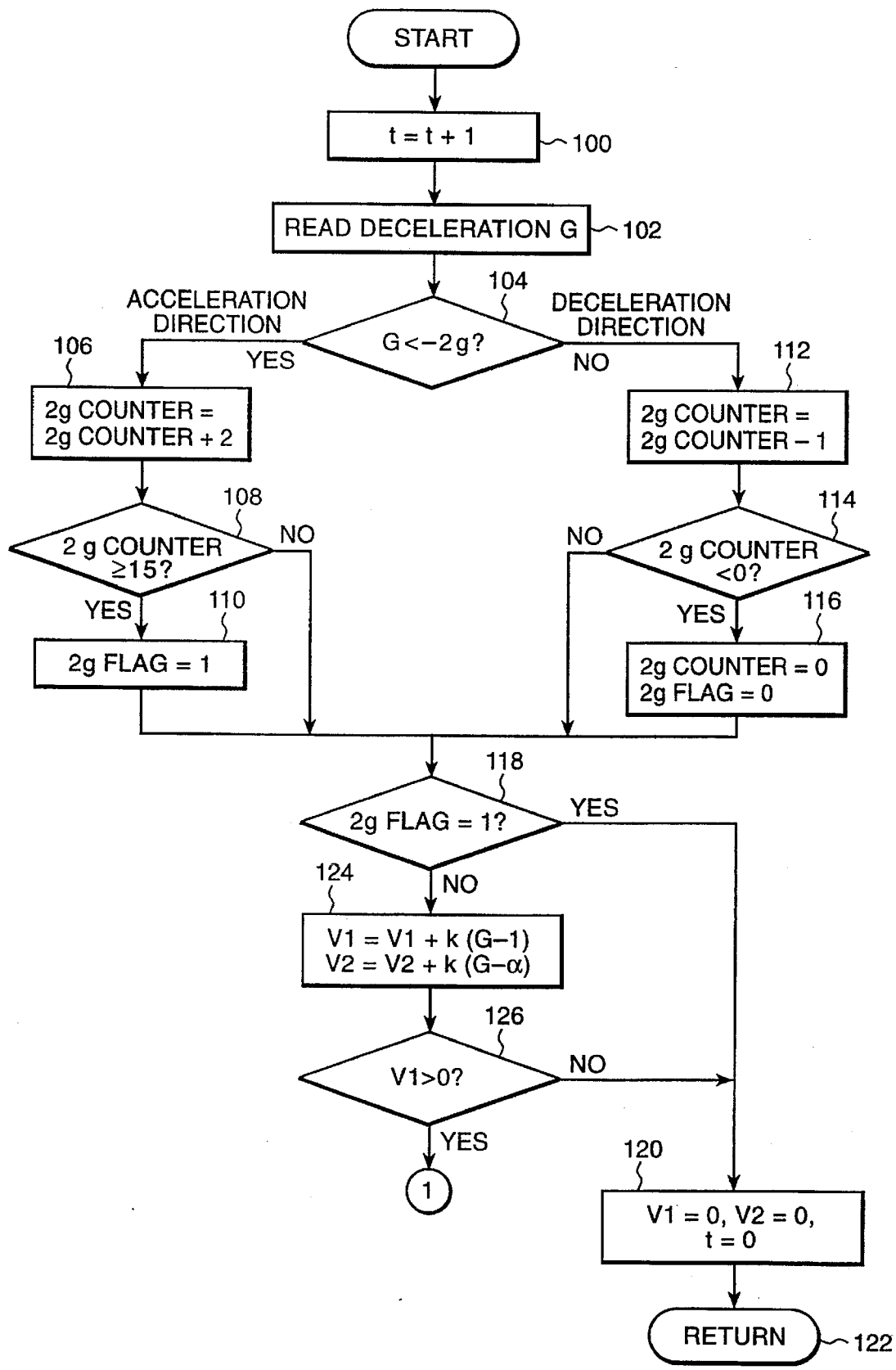
FIG. 3 is a portion of main flow chart showing the processing procedure of a CPU included in the control apparatus.
Figure 4:
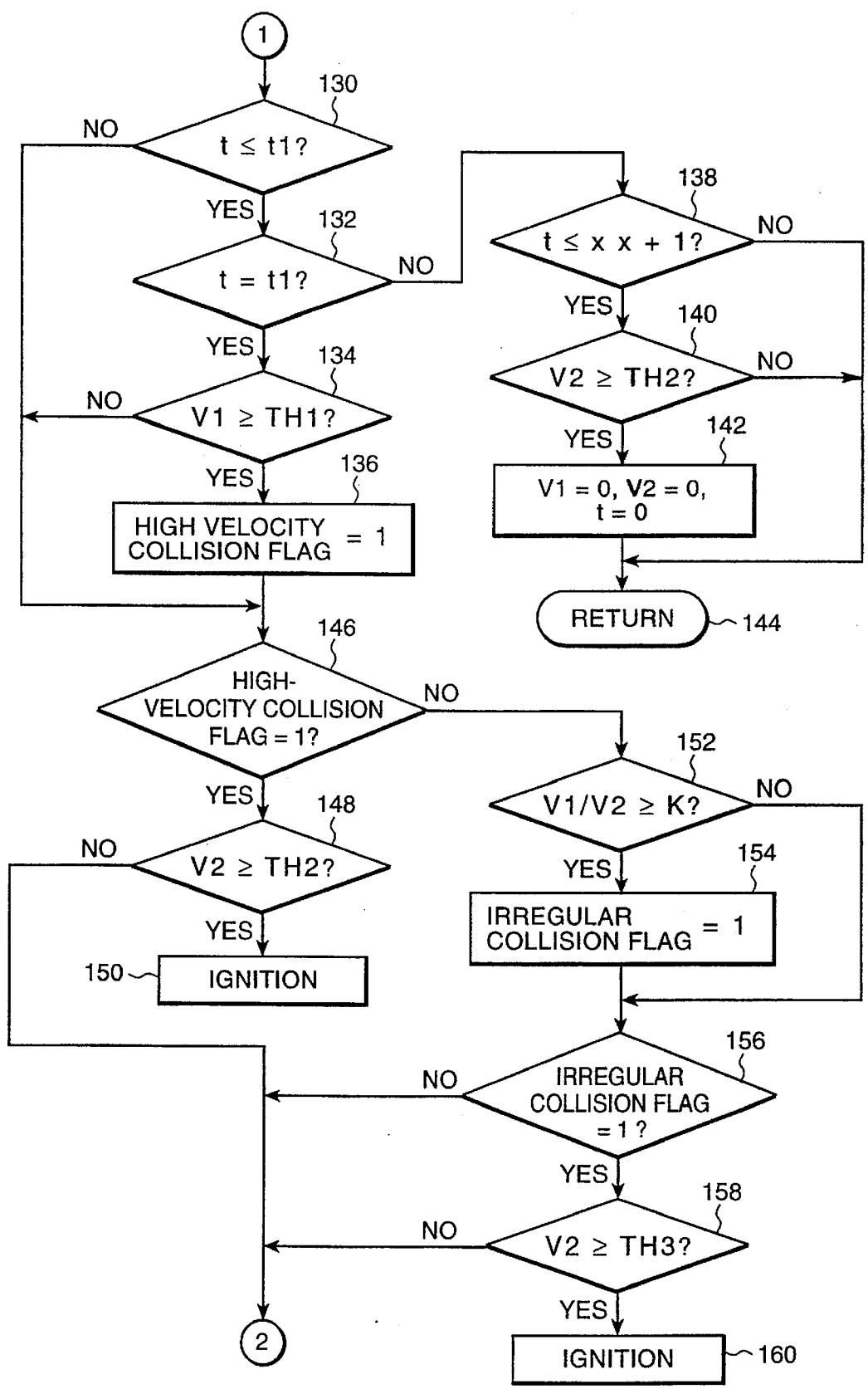
FIG. 4 is a continuation of the main flow chart of FIG. 3 showing the processing procedure of a CPU included in the control apparatus.
Figure 5:
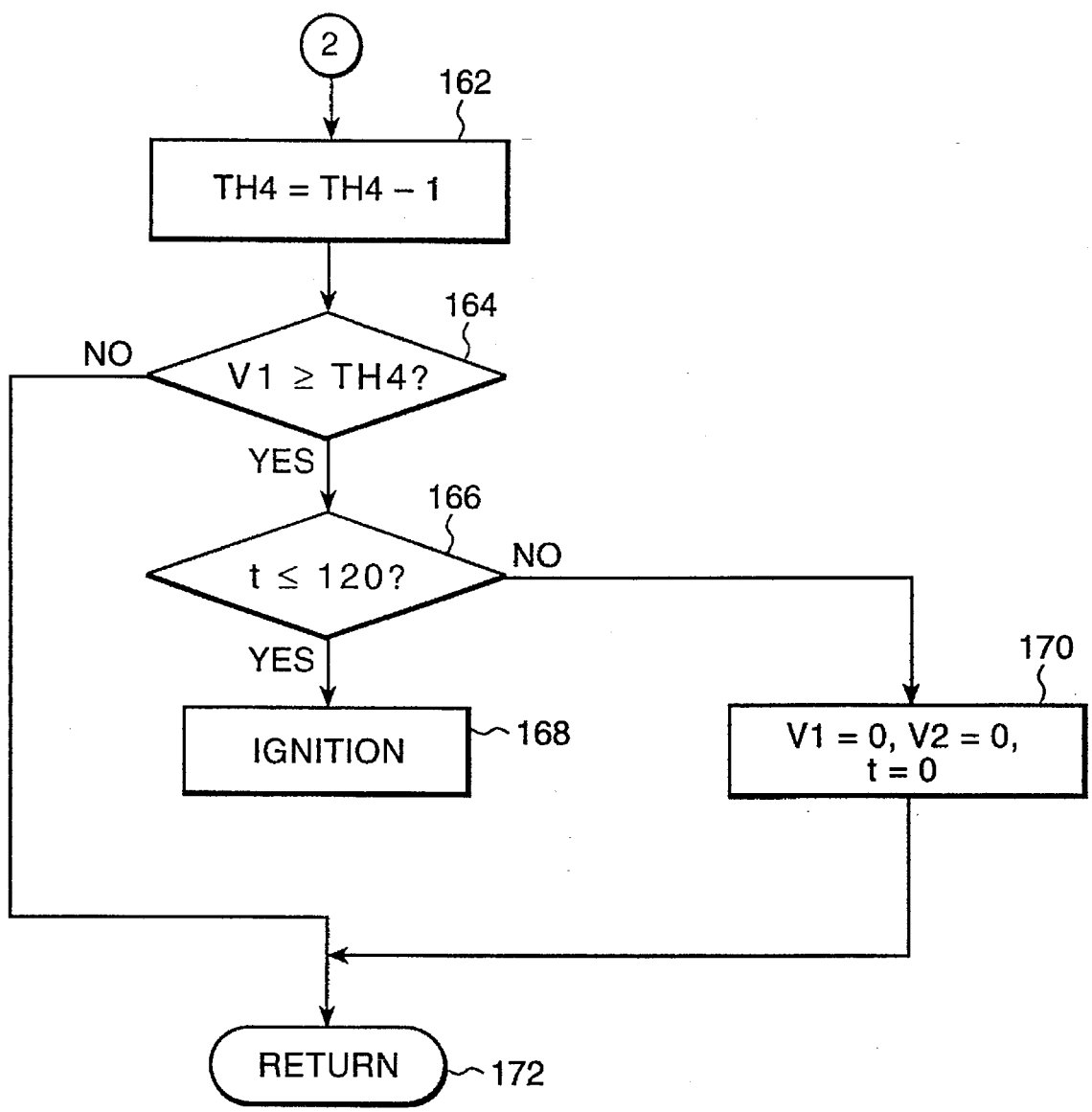
FIG. 5 is a further continuation of the main flow chart of FIG. 4 showing the processing procedure of a CPU included in the controlling apparatus.

FIGS. 3 through 5 are main flow charts showing the processing procedure of the CPU 91 included in the control apparatus 9.

First of all, at step 100 in FIG. 3, a time unit 1 is added to the elapsed time variable t and wherein time is measured while taking 0.5 ms as the unit. At step 102, the deceleration G of the vehicle is read from the acceleration sensor 15. Herein, the direction of acceleration applied to the vehicle is regarded as negative and the direction of deceleration is regarded as positive.

Then at step 104, it is determined whether the vehicle deceleration G is less than −2 g in order to prevent activation of the air bag when, for example, the steering is moved in the acceleration direction by the driver in a vehicle equipped with a telescoping steering column. Herein, g means the unit of acceleration and deceleration G, and 1 g is 9.8 m/sec². Deceleration G of −2 g means that the acceleration sensor 15 senses acceleration of 2 g in the forward or travelling direction of the vehicle.

As shown in FIG. 3, in the case where the vehicle deceleration G is less than −2 g, a decison at step 104 yields "yes" and two is added to the count of a 2 g counter at step 106. The 2 g counter is not illustrated and is included in or emulated within the CPU 91. Subsequently, in this case, it is determined at step 108 whether the count in the 2 g counter is at least 15.

If the count in the 2 g counter is at least 15, then a decision at step 108 yields "yes," and a 2 g flag is set equal to a logic 1 at step 110. In this case, a decision at step 118 as to whether the 2 g flag is a logic 1 yields "yes." At subsequent step 120, all of the first velocity change value V1, the second velocity change value V2, and the calculated elapsed time t are set equal to zero, and the return step is effected at step 122.

If the count in the 2 g counter is less than 15, then a decision at step 108 yields "no". The decision at step 118 as to whether the 2 g flag is a logic 1 yields "no". Processing proceeds to the integral calculation of step 124.

If the vehicle deceleration G is at least −2 g, then a decision at step 104 yields "no" and one is subsequently subtracted from the count in the 2 g counter at step 112.

If the count in the 2 g counter is at least 0, then a decision at step 114 yields "no" and processing proceeds to step 118.

If the count in the 2 g counter is less than zero, then a decision at step 114 yields "yes" and the count in the 2 g counter is set equal to zero and the 2 g flag is set equal to a logic 0, with processing then proceeding to step 118.

The above described processing ranging from step 104 to step 118 has the following meaning. If the count in the 2 g counter becomes at least 15, all of the first velocity change value V1, the second velocity change value V2, and the calculated elapsed time t are cleared (i.e., reset or reinitialized to zero). When deceleration less than −2 g continues for 7.5 ms or more, therefore, no collision is judged to have occurred and the inflator is not started.

If it is determined subsequently at step 118 that the 2 g flag is not a logic 1, processing proceeds to step 124 and the integral calculations of deceleration G are performed.

The first velocity change value V1 is a time integral of the deviation of the vehicle deceleration G from a threshold value of 1 g. The second velocity change value V2 is an integral of the deviation of the vehicle deceleration from a threshold value of α g. Herein, the threshold value α g is greater than 1 g. In the present embodiment, the threshold value α g is set equal to 6 g. Actual calculations of the first and second velcoity change values V1 and V2 are described later in the description of another embodiment and are shown especially in FIGS. 10A through 10C and FIGS. 11A through 11C. In the present embodiment, deceleration less than the deceleration threshold value becomes a negative component. In embodiments described later, however, deceleration less than the deceleration value is offset. (See steps 206 through 212 of FIG. 9.)

If the first velocity change value V1 is negative after the integral calculations performed at step 124 (FIG. 3), then a decision at step 126 yields "no" and processing proceeds to step 120 to clear all of the first velocity change value V1, the second velocity change value V2, and the calculated elapsed time t.

If both the first velocity change value V1 and the second velocity change value V2 are at least zero, then processing proceeds to step 130 (FIG. 4) and the calculated elapsed time is compared in magnitude with the threshold value t1.

In the case of a shock, such as hammerblow, applied near the electric control unit (ECU), a large deceleration G is generated. The threshold value t1 prevents the ECU from activating the air bag system. In addition, the threshold value t1 is provided for discriminating between a low-velocity collision and a medium-velocity collision as described below.

Figure 6:
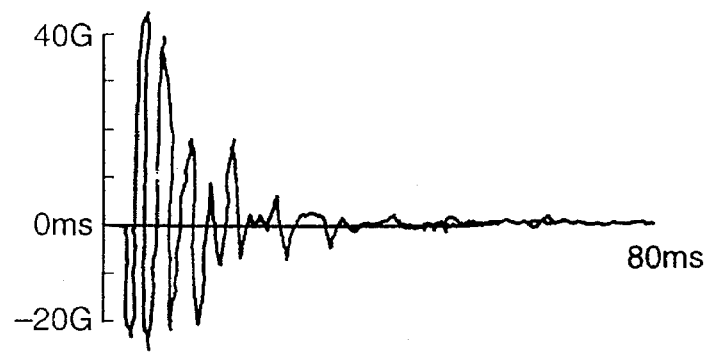
FIG. 6 is a dv/dt waveform diagram showing deceleration at the time of and during a hammerblow.

FIG. 6 shows a waveform of deceleration G with time during a hammerblow. Because of a relatively short pulse width or duration and an oscillating waveform signative, the calculation time becomes long. Since the pulse width or duration is several ms, however, operation of the ignition device 4 (FIG. 1) is prohibited for several ms since the start of calculations.

If the calculated elapsed time t, i.e., time elapsed since start of the integral calculations is greater than the threshold value t1, then a decision at step 130 of FIG. 4 yields "no" and processing proceeds to step 146.

If the calculated elapsed time t is less than or equal to the threshold value t1, then a decision at step 130 yields "yes" and processing proceeds to step 132.

If t=t1, then a decision at step 132 yields "yes" and processing proceeds to step 134. If the first velocity change value V1 is less than the velocity threshold value TH1, a decision at step 134 yields "no" and processing proceeds to step 146.

If the first velocity change value V1 is greater than or equal to the velocity threshold value TH1 the decision at step 134 yields "yes" and a high-velocity collision flag is set equal to a logic 1 at step 136.

If t≠t1, i.e., t<t1, the decision at step 132 yields "no" and processing proceeds to step 138 to avoid an activation decision. In the present embodiment, the threshold t1 has a value of 6 ms. The velocity threshold TH1 has a value of 1 m/sec.

As for the above described processing contents of steps 130 through 136, the activation decision of the air bag system is not made when the time elapsed since start of the integral calculation does not reach 6 ms, whereas the activation decision is made when the time elapsed since the start of the integral calculation has reached 6 ms. Even if deceleration G is generated by a hammerblow, the air bag is not inflated for 6 ms.

If the calculated elapsed time t is less than the threshold value t1 at step 132, then processing proceeds to step 138 and a threshold decision of the calculated elapsed time t is made.

If the calculated elapsed time t is greater than a threshold value (xx+1), a decision at step 138 yields "no" and return is effected at step 144.

If the calculated elapsed time t is less than or equal to the threshold value (xx+1), a decision at step 138 yields "yes" and a threshold decision of the second velocity change value V2 is made at step 140.

If the second velocity change value V2 is less than a second velocity threshold value TH2, then the decision at step 140 yields "no" and return is effected at step 144.

If the second velocity change value V2 is greater than or equal to the velocity threshold value TH2, then the decision at step 140 yields "yes" and the first velocity change value V1 and the second velocity change value V2 are set equal to zero at step 142, return being effected at step 144.

The above-described processing of step 138 through step 144 has the following meaning. When the calculated elapsed time t is shorter than 6 ms and the calculated elapsed time t is less than or equal to the threshold value (xx+1), resetting is performed even if the second velocity change value V2 has reached the second velocity threshold value TH2.

As a case where deceleration of at least a full scale (−36 g) is generated in a short time, breakage or failure of the wire in the acceleration sensor 15 is a possibility.

If the calculated elapsed time t is less than or equal to the threshold value (xx+1) and the second velocity change value V2 has reached the threshold value TH2, then deceleration G other than that of a collision of the vehicle is considered to have been generated by failure of wire in the acceleration sensor 15 and the decision for activation is not made.

By the way, xx in step 138 means ignition time and is defined by equation (1).

$$xx = TH2/G_f \qquad (1)$$

TH2 is a threshold value of the second velocity change value V2, and $G_f$ is deceleration of the vehicle in full scale. In the present embodiment, (xx+1) is approximately 2 ms and the second velocity threshold value V2 is 3 m/sec.

If the first velocity change value V1 is Greater than or equal to the threshold value TH1 at step 134, then the high-velocity collision flag is set equal to a logic 1 and processing proceeds to step 146. A decision at step 146 yields "yes" and processing proceeds to step 148.

If the second velocity change value V2 is greater than or equal to the threshold value TH2, then a decision at step 148 yields "yes" and the inflator is ignited at step 150.

If the decision at step 130 or 134 yields "no," then the high-velocity collision flag is a logic 0. Therefore, the decision at step 146 yields "no" and processing proceeds to step 152.

If the ratio of the first velocity change value V1 to the second velocity change value V2 is greater than or equal to a predetermined threshold value K, a decision at step 152 yields "yes" and an "irregular" collision flag is set equal to a logic 1 at step 154. In the present embodiment, the threshold value K is set equal to 0.5.

Since the irregular collision flag is a logic 1, a decision at succeeding step 156 yields "yes" and processing proceeds to step 158 to compare the second velocity change value in magnitude with a third threshold value TH3. The threshold value TH3 is greater than the threshold value TH2. In the present embodiment, the velocity threshold value TH3 is set equal to 4 m/sec.

If the second velocity change value V2 is greater than or equal to the threshold value TH3, then the decision at step 158 yields "yes" and ignition is performed at subsequent step 160.

If the ratio of the first velocity change value V1 to the second velocity change value V2 is less than the threshold value K, then the decision at step 152 yields "no." Since the irregular collision flag is a logic 0, a decision at succeeding step 156 yields "no" and processing proceeds to step 162 shown in FIG. 5.

If the second velocity change value V2 is less than the threshold value TH3, a decision at step 158 yields "no" and processing proceeds to step 162.

The above described processing of steps 130 through 136 and steps 146 through 150 has the following meaning. If the first velocity change value V1 and the second velocity change value V2 have already reached, respectively, the threshold values TH1 and TH2 when the calculated elapsed time t reaches 6 ms, the inflator is started.

The line stretching from step 146 to step 152 has the following meaning. In case the first velocity change value V1 has not reached the threshold value TH1, even if the calculated elapsed time t reaches the predetermined threshold value t1, the threshold value for the activation decision is raised.

Figure 7:
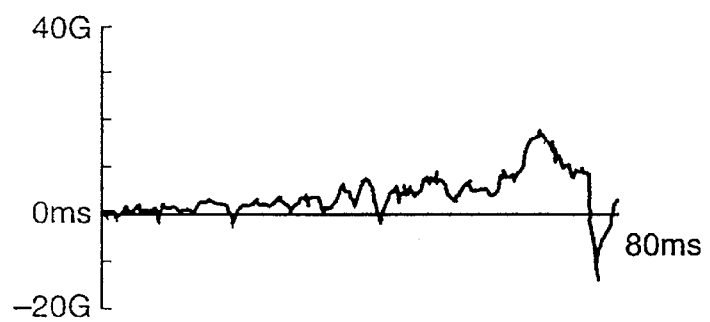
FIG. 7 is a dv/dt waveform diagram of deceleration at the time of a collision with a low velocity (of approximately 15 km/hour)
Figure 8:
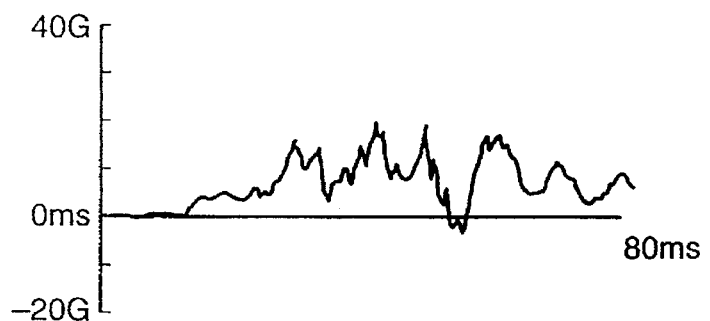
FIG. 8 is a dv/dt waveform diagram of deceleration at the time of a collision with a medium velocity (of approximately 30 km/hour)

Waveforms of deceleration G in case of a collision at a low velocity (of approximately 15 km/hour) and a collision at a medium velocity (of approximately 30 km/hour) are shown in FIG. 7 and FIG. 8, respectively. In case of a low-velocity collision, the deceleration G rises relatively gently in the initial stage of the collision as compared with a medium-velocity collision. Even if the predetermined time threshold value t1 has elapsed, therefore, the first velocity change value does not reach the threshold value TH1. By providing the processing pathway from step 146 to step 152, therefore, a low-velocity collision is prevented from activating the air bag system and a medium-velocity collision is allowed to activate the air bag system.

The above described processing of step 152 through step 160 has the following meaning. If the ratio of the first velocity change value V1 to the second velocity change value V2 is greater than or equal to the threshold value K when the calculated elapse time t has reached at least 6 ms, the threshold value of the second velocity change value V2 is changed (i.e., updated) to TH3 which is greater than TH2. In other words, if the calculated elapsed time t has reached at least 6 ms and the ratio of the second velocity change value V2 to the first velocity change value V1 is less than the predetermined threshold value K, the threshold value of the second velocity change value V2 is raised.

In case of a low-velocity collision, the waveform of deceleration G rises relatively gently as shown in FIG. 7. Therefore, the proportion of a low deceleration component is greater than that of a high deceleration component. When the ratio of the second velocity change value V2 to the first velocity change value V1 is less than the predetermined threshold value K for at least a predetermined time, the threshold value of the second velocity change value V2 is raised. Thereby it becomes possible to prevent a low-velocity collision from activating the air bag system. Processing of the ratio between the two velocity change values V1 and V2 will be described later in further detail in the description of a second embodiment.

If the decision at step 148, 156 or 158 of FIG. 4 yields "no," then one is subtracted from the third threshold value TH4 at step 162 of FIG. 5 and the first velocity change value V1 is compared with the threshold value TH4 at step 164.

If the first velocity change value V1 is greater than or equal to the threshold value TH4, a decision at step 164 yields "yes" and processing proceeds to step 166. If the calculated elapsed time t is less than or equal to 120 ms, a decision at step 166 yields "yes" and ignition is performed at step 168.

If the calculated elapsed time t is greater than 120 ms, the decision at step 166 yields "no" and processing proceeds to step 170. All of the first velocity change value V1, the second velocity change value V2, and the calculation elapsed time t are cleared (i.e., reset) at step 170 and return is made at step 172.

If the first velocity change value V1 is less than the threshold value TH4, the decision at step 164 yields "no" and return is made at succeeding step 172. In the present embodiment, the threshold value TH4 is set equal to 5 m/sec.

The above described processing of step 162 through step 172 has the following meaning. When the calculated elapsed time t is greater than or equal to 120 ms even if the first velocity change value V1 reaches the threshold value TH4, resetting is performed. This aims at preventing activation in case a shift occurs in the offset voltage of the acceleration sensor 15.

If an offset shift occurs in the acceleration sensor 15, e.g., offset voltage shift of 1 g occurs in the minus direction, it cannot be distinguished from a deceleration input of 1 g. If calculations are performed over a long time, therefore, the start decision is reached in some cases.

The offset voltage shift of the acceleration sensor 15 is prevented from activating the air bag system. When the first velocity change value V1 does not reach the threshold value TH4 even if calculations are performed longer than a fixed time, no collision is judged to have occurred and the decision calculation is re-initialized. In the present embodiment, the threshold value TH4 is adapted to be decreased one by one with the calculated elapsed time t.

In the present embodiment, it is attempted to cause ignition with a probability of 100% at the time of an irregular collision with a velocity of at least 30 km/hour. Since the calculated elapsed time t has reached 100 ms in that case, the threshold value is set equal to 120 ms tentatively.

In the present embodiment, the threshold value for the activation decision is made larger by the above described action according to the magnitude of the first velocity change value V1 obtained when the time elapsed since the first velocity change value V1 became positive, i.e., the calculated elapsed time t has reached the predetermined threshold value t1. Thereby, it is possible to prevent a low-velocity collision from activating the air bag system and make a medium-velocity collision activate the air bag system.

Futhermore, when the ratio of the first velocity change value V1 to the second velocity change value V2 is greater than the predtermined threshold value K, the threshold value of the second velocity change value V2 is made larger. Thereby, a decision on activation at the time of a medium-velocity collision is facilitated. Furthermore, prevention of activation is facilitated when the vehicle has fallen into a ditch or the like.

Furthermore, it is possible to sufficiently cope with a difference in the waveform of the deceleration G between a collision of a large-sized, vehicle and a collision of a small-sized vehicle.

In the case of a large-sized vehicle, deceleration G rises slowly at the time of a medium-velocity collision. The waveform thereof becomes similar to the waveform obtained at the time of a low-velocity collision. Therefore, activation can be prevented at the time of a low-velocity collision by raising the threshold value of the activation decision when the calculated elapsed time t has become greater than or equal to the threshold value t1.

Furthermore, in the case of a small-sized vehicle, deceleration G rises rapidly in the early stage of a medium-velocity collision. Therefore, the ratio of the second vehicle change value V2 to the first velocity change value V1 is small. By raising the threshold value of the second velocity change value V2 when the ratio is less than or equal to the predetermined value within the prdetermined time, it is possible to prevent a low-velocity collision from activating the air bag system. As a result, the air bag control apparatus can be used properly for both large-sized vehicles and small-sized vehicles by a simply changing the threshold value.

The processing procedure of a second embodiment of the Present invention will now be described by referring to a flow chart shown in FIG. 9. The embodiment of FIG. 9 has an apparatus configuration identical with FIGS. 1 and 2 of the first embodiment.

Figure 9:
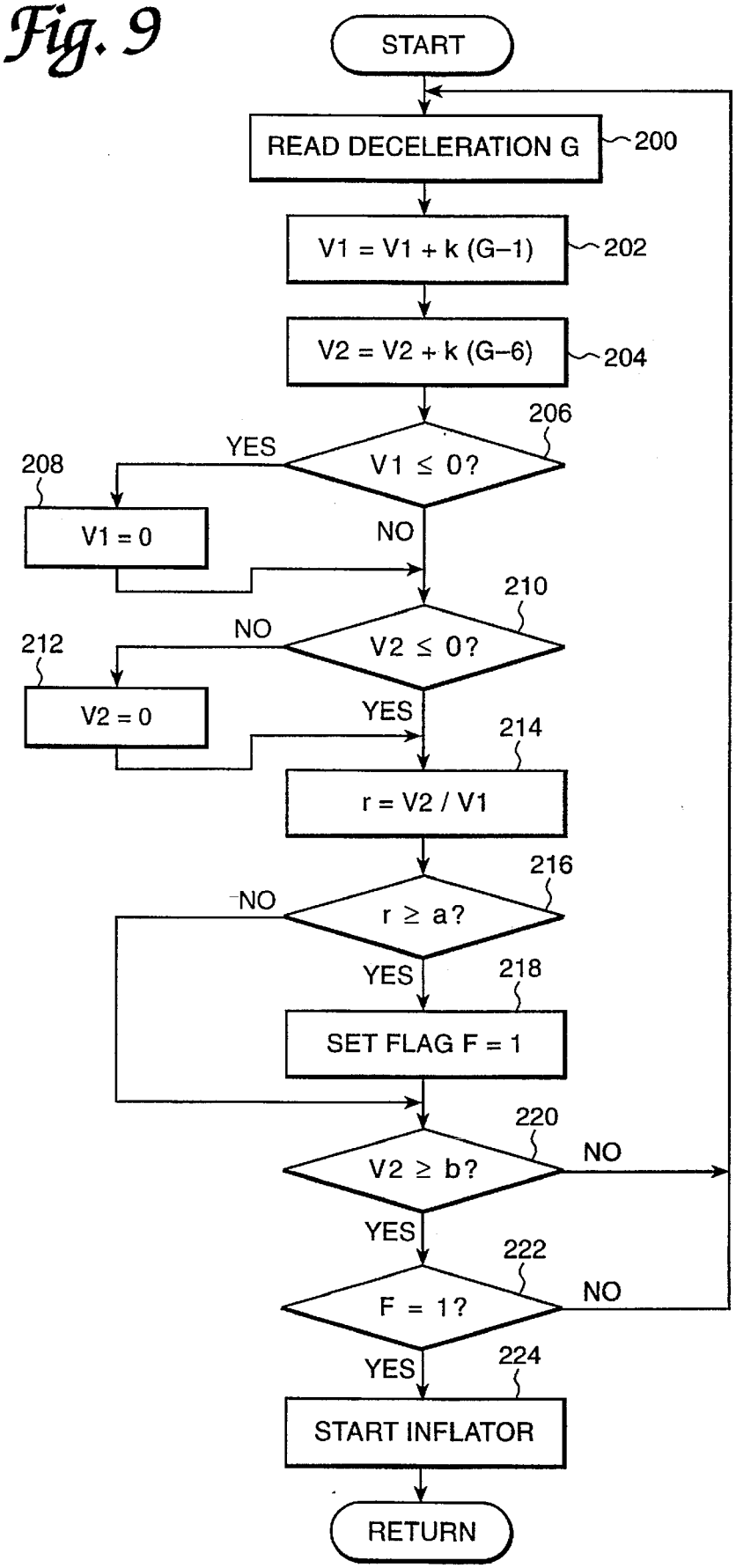
FIG. 9 is a flow chart showing the processing procedure of a CPU in a second embodiment of the present invention.
Figure 10A:
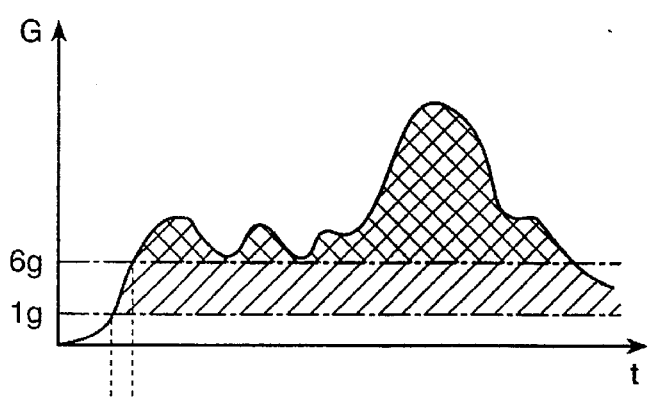
FIGS. 10A through 10C are characteristic diagrams showing the change characteristics of deceleration, the first velocity change value, the second velocity change value, and the V2/V1 ratio in the case of a medium-velocity collision.

The program of FIG. 9 is a main program processed by the CPU 91. At step 200, deceleration G is read from the acceleration sensor 15. The deceleration G is assigned a positive value in the sense of negative acceleration. At step 206, the first velocity change value V1 is calculated as the integral of the deviation of deceleration G from a threshold value of 1 g. The accumulated value of the product of the time period k and the difference between deceleration G and the threshold value 1 g is calculated. As shown in FIG. 10A, the first velocity change value V1 means the time integral of the characteristic obtained by offsetting the origin of the deceleration G by 1 g in the positive direction, i.e., 1 g or less is within a dead zone.

Then at step 204, the second velocity change value V2 is calculated as the integral of the deviation of the deceleration G from the threshold value 6 g. The accumulated value of the product of the time period k and the difference between the deceleration G and the threshold value 6 g is calculated. As shown in FIG. 10A, the second velocity change value V2 means the time integral of the characteristic obtained by offsetting the origin of deceleration G by 6 g in the positive direction.

If the first velocity change value V1 is less than or equal to 0 at step 206, V1 is set equal to an initial value 0 at step 208. That is to say, in a non-collision state, (G–1) becomes a negative value and sooner or later the calculated Velocity value V becomes negative. In order to prevent this negative value from increasing in the normal state, therefore, the first velocity change value V1 is bound to an initial value of 0.

At steps 210 and 212, processing similar to that of the first velocity change value V1 is conducted with regard to the second velocity change value V2. The second velocity change value V2 is bounded to an initial value of 0 in order to prevent the negative value of the second velocity change value V2 from increasing in the normal state.

Then at step 214, the ratio r of the second velocity change value V2 to the first velocity change value V1 is calculated. At step 216, it is determined whether this ratio r is greater than or equal to a predetermined value a. If the decision yields "yes," the first start condition is judged to be satisfied and a flag F is set equal to a logic 1. If the decision yields "no," the start time of the inflator is judged to have not been reached and processing proceeds to step 220. Subsequently at step 220, it is determined whether the second velocity change value V2 has reached at least a predetermined value b. If the decision yields "no," the start time is judged to have not been reached and processing returns to step 200 to execute the above described processing of the collision decision in the next control period.

If the second velocity change value V2 is judged at step 220 to be greater than or equal to the predetermined value b, the second start condition is judged to have been satisfied and processing proceeds to step 222. At step 222, it is determined whether the flag F is a logic 1, i.e., whether the first start condition is satisfied. If the first start condition is judged to be satisfied, processing proceeds to step 224 and a signal for starting the inflator is outputted to the transistor 31, the air bag being thus activated.

Operation conducted by the above described processing procedure will now be described.

Figure 10B:
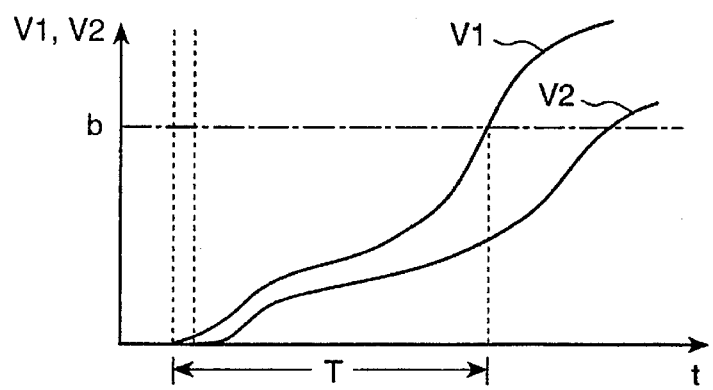
Figure 10C:
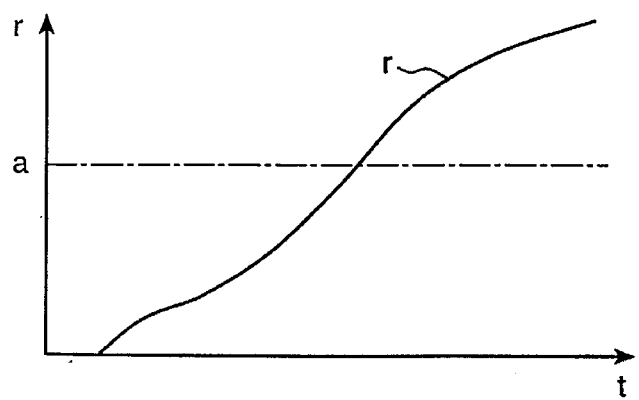

Characteristic curves of a medium-velocity collision are shown in FIGS. 10A through 10C. Characteristic curves of a low-velocity collision are shown in FIGS. 11A through 11C.

Figure 11A:
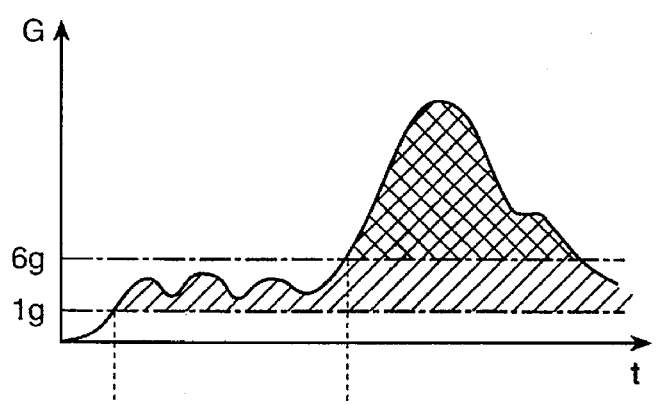
FIGS. 11A through 11C are characteristic diagrams showing the change characteristics of deceleration, the first velocity change value, the second velocity change value, and the V2/V1 ratio in the case of a low-velocity collision.
Figure 11B:
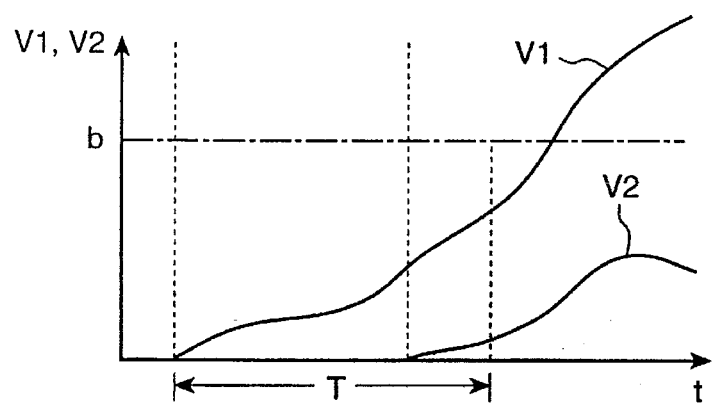
Figure 11C:
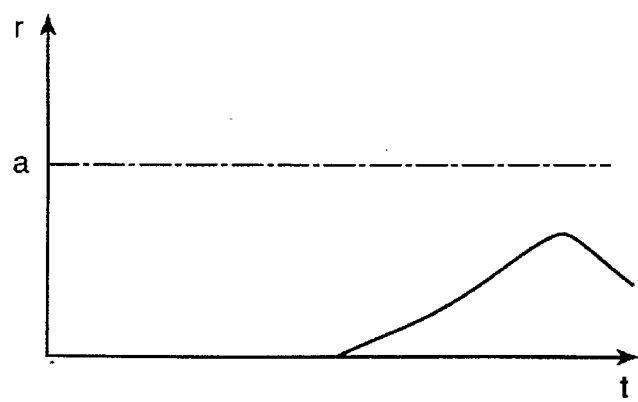
Figure 12A:
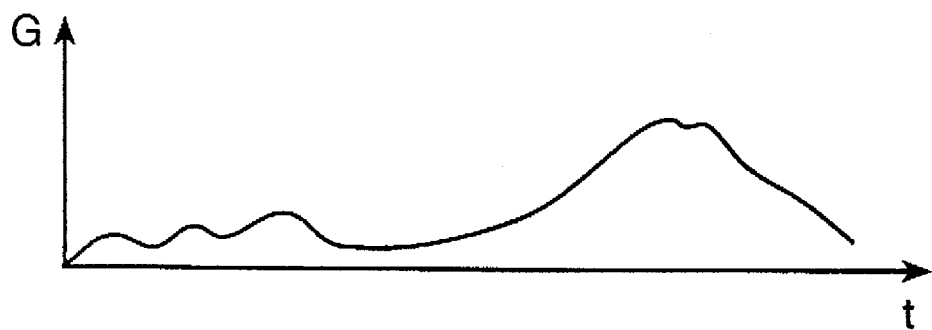
FIGS. 12A and 12B are characteristic diagrams showing change characteristics of deceleration in the case of a low-velocity collision and a medium-velocity collision, respectively.
Figure 12B:
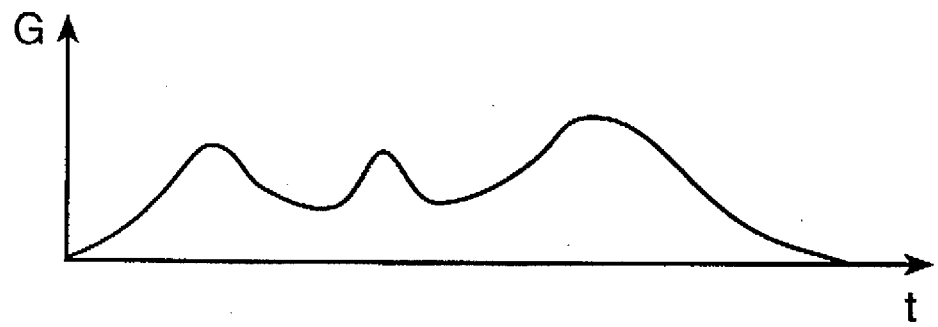

In the case of a low-velocity collision, the magnitude of the deceleration in the early stage is relatively small as shown in FIG. 11A. In the case of a medium-velocity collision, however, the magnitude of the deceleration in the early stage is large as shown in FIG. 10A. Therefore, the first velocity change value V1 obtained by integrating the deceleration provided with an offset equivalent to the first threshold value of 1 g and the second velocity change value V2 obtained by integrating deceleration provided with an offset equivalent to the second threshold value of 6 g have characteristic curves as shown in FIG. 10B in case of a medium-velocity collision and have characteristic curves as shown in FIG. 11B in case of a low-velocity collision. It will be appreciated that the increase in the second velocity change value V2 is small in the case of a low-velocity collision. Therefore, the ratio r is also represented by a curve shown in FIG. 10C in the case of a medium-velocity collision and the curve shown in FIG. 11C in the case of a low-velocity collision.

If the ratio r exceeds the predetermined value a, therefore, the collision can be judged to be a medium-velocity collision. If the ratio r does not exceed the predetermined value a, the collision can be judged to be a low-velocity collision. Even if the first velocity change value V1 exceeds the predetermined value b, the collision is judged to be a low-velocity collision, and the inflator is not started when the second velocity change value V2 does not exceed the predetermined value a.

In the above described embodiment, step 200 is the deceleration reading means, step 202 is the first velocity change value calculation means, step 204 is the second velocity change value calculation means, steps 206 through 212 are the initial value setting means, step 214 is the ratio calculation means, step 216 is the first start condition decision means, step 220 is the second start condition decision means, and step 224 is the inflator start means.

In this embodiment, the ratio between the two velocity change values is calculated. So long as the relatively small deceleration in the early stage of a low-velocity collision can be prevented from starting the air bag system, the difference between the two values, the log ratio between them, or the like may be used.

Figure 13:
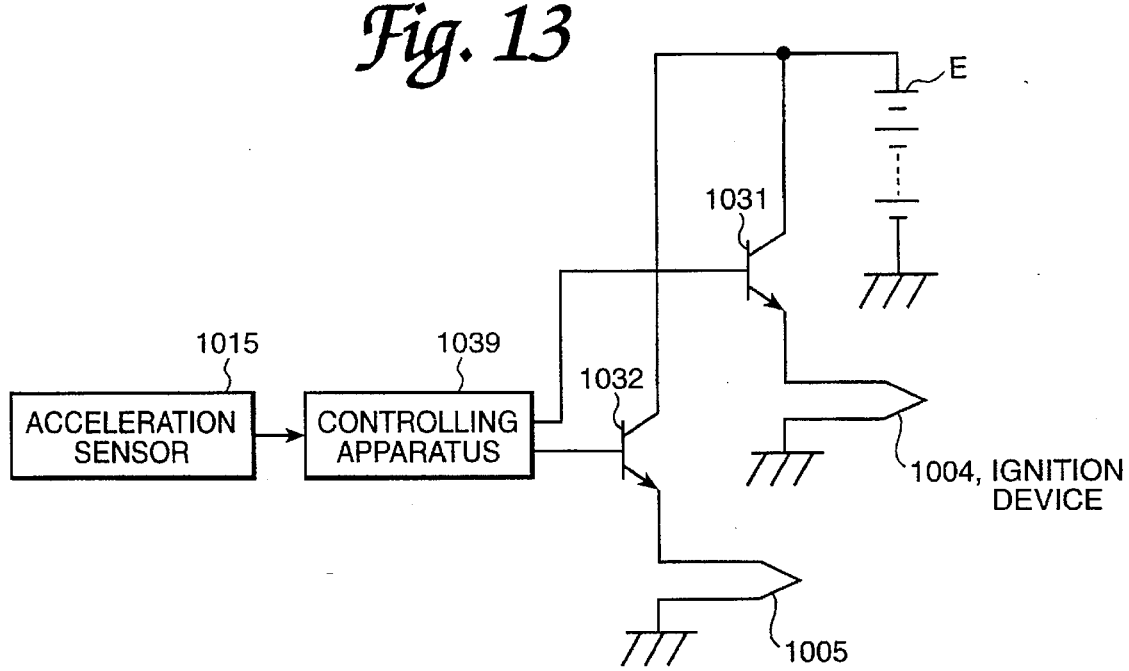
FIG. 13 is a diagram showing the entire configuration of third embodiment of an air bag control apparatus according to the present invention.

A third embodiment of the present invention is shown in FIG. 13. As shown, an acceleration signal detected by an acceleration sensor 1015 is inputted to a control apparatus 1009. The collision decision calculation is then executed. If a collision is judged to have occurred, the control apparatus 1009 outputs inflator starting signals to transistors 1031 and 1032, respectively, connected in series with inflator ignition devices 1004 and 1005. The ignition device 1004 is a driver's seat ignition device for a driver's seat inflator. The ignition device 1005 is a passenger's seat ignition device for a passenger's seat inflator. By biasing the transistor 1031 or 1032 into conduction, a current flows through the ignition device 1004 or 1005 and the driver's seat inflator or the passenger's seat inflator is activated.

Figure 14:
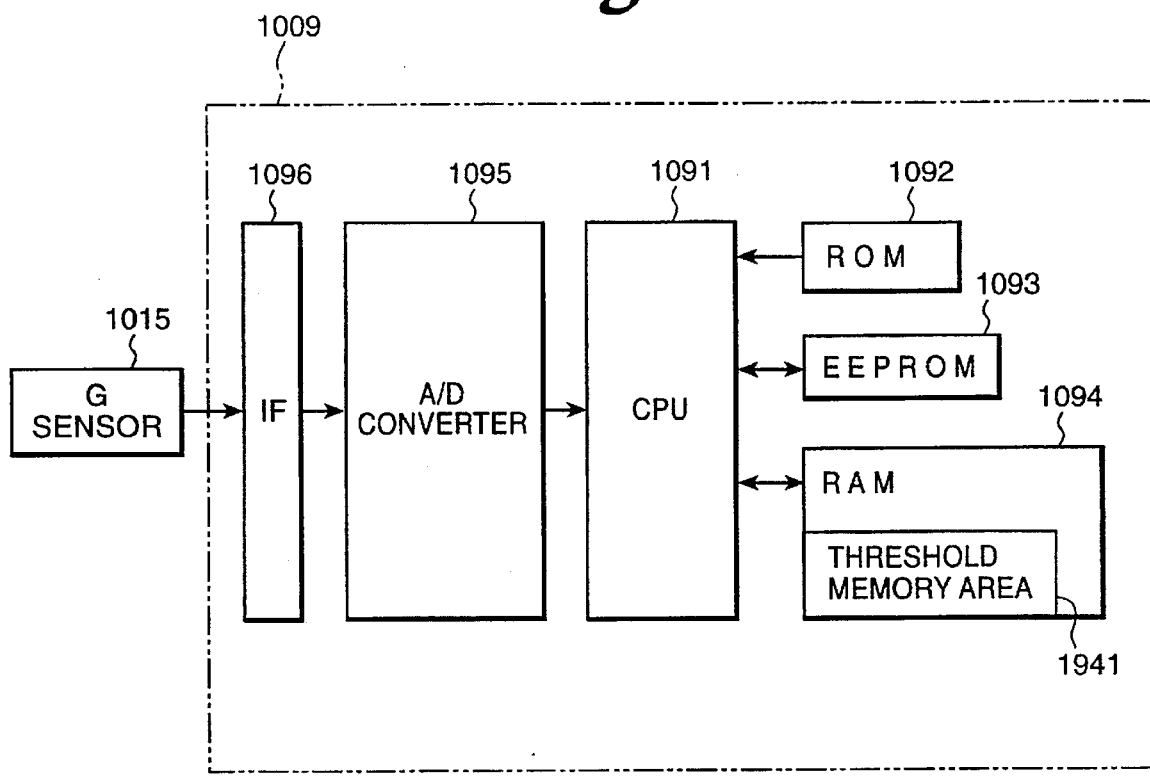
FIG. 14 is a block diagram showing the functional configuration of the control apparatus.

As shown in FIG. 14, the control apparatus 1009 includes a CPU 1091, a ROM 1092 storing a control program and a collision decision program, an EEPROM allowing external write operation, a RAM 1094 for storing various data and the like, an A/D converter 1095, and an interface (IF) 1096. In the EEPROM 1093, data in map form are stored for deriving delay time τ from various measured values. In the RAM 1094, a threshold memory area 1941 is formed. The threshold memory area 1941 stores threshold values for judging ignition of the inflator so as to be associated with physical displacement values of the vehicle based upon the deceleration signal supplied from the acceleration sensor 1015. The deceleration signal supplied from the acceleration sensor 1015 is inputted to the CPU 1091 via the interface 1096 and the A/D converter 1095.

Processing procedure of the CPU 1091 in the controlling apparatus 1009 which is used in the present embodiment apparatus will now be described by referring to a flow chart of FIG. 15 and FIG. 16.

Figure 15:
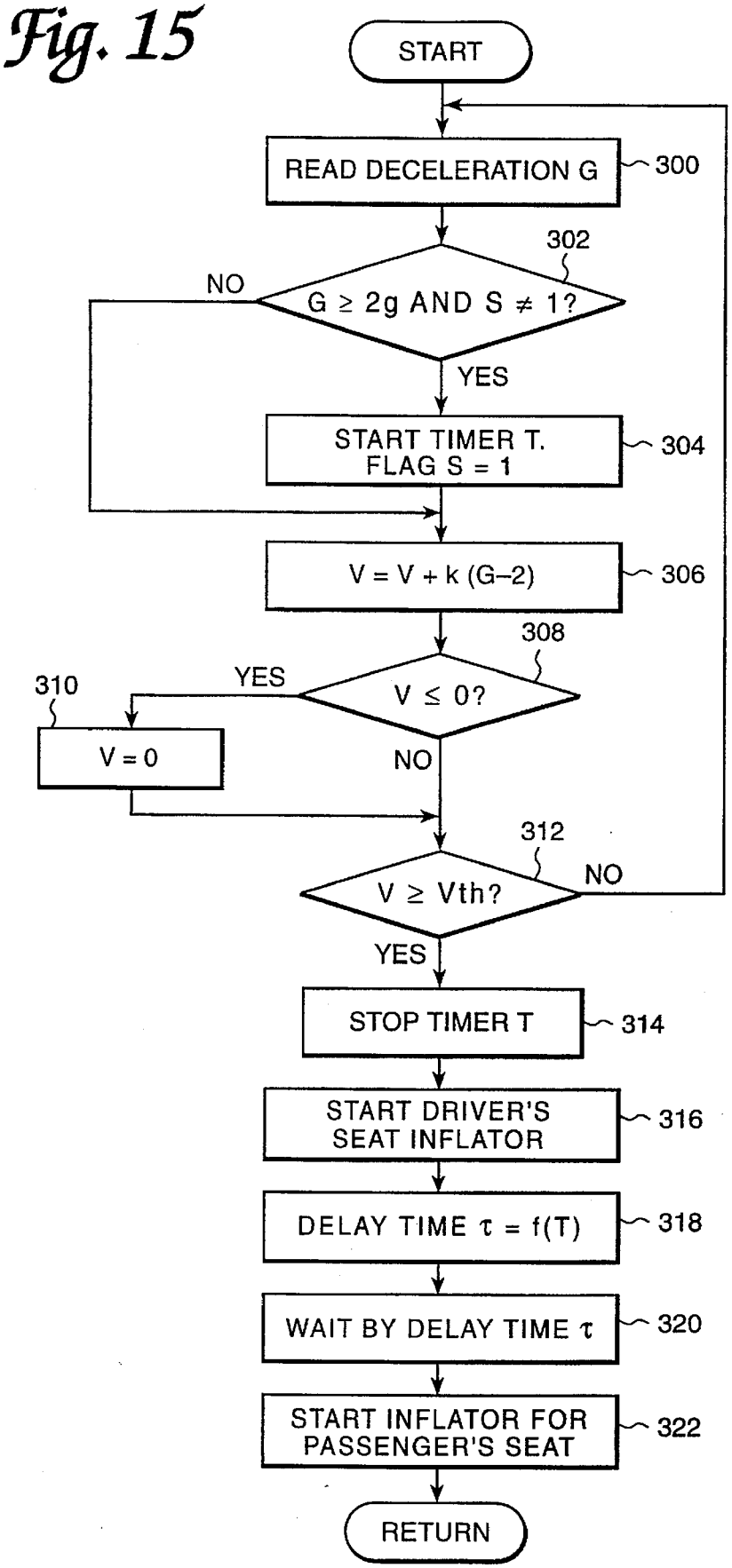
FIG. 15 is a flow chart showing the processing procedure of a CPU in a third embodiment apparatus.
Figure 16A:
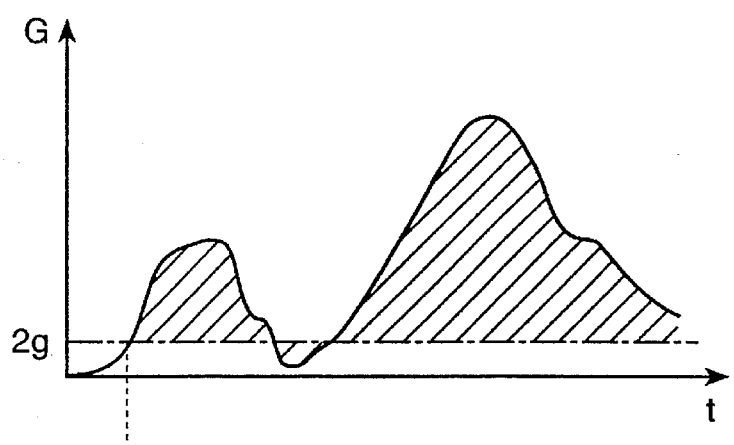
FIG. 16 is a waveform diagram illustrating operation of the third embodiment apparatus.
Figure 16B:
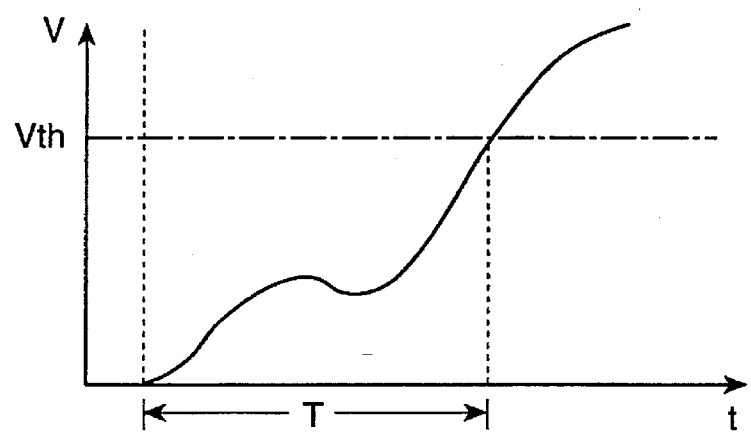

The program of FIG. 15 is a main program processed by the CPU 1091. At step 300, deceleration G is read from the acceleration sensor 1015. The deceleration G has a positive value in the sense of negative acceleration. At step 302, it is determined whether the detected deceleration is greater than or equal to the threshold value 2 g and a flag S is not a logic 1. If the decision yields "yes," then at step 304 a timer T is started and the flag S is set equal to a logic 1 in order to store the fact that the timer T has been started. If the decision yields "no," processing proceeds to step 306. The calculation for the collision decision is started where detected deceleration reaches of exceeds the threshold value 2 g. At step 306, the integral value V of deviation of deceleration G from the threshold value 2 g (referred to as velocity calculation value) is calculated. The accumulated value of the product of time period k and the difference between deceleration G and the threshold value 2 g is calculated. As shown in FIG. 16, this calculated velocity value V means the time integral of the characteristic obtained by offsetting the origin of deceleration G by 2 g in the positive direction, i.e., 2 g or less is within a dead zone.

If the calculated velocity value V is less than or equal to 0 at step 308, V is set equal to an initial value 0 at step 310. In a non-collision state, (G−2) becomes a negative value and sooner or later the calculated velocity value V becomes negative. In order to prevent this negative value from increasing in the normal state, therefore, the calculated velocity value V is bound to an initial value 0.

At step 312, it is determined whether the calculated velocity value V has reached a threshold value Vth. If the calculated velocity value V has not yet reached the threshold value Vth at step 312, processing returns to step 300 and the next control cycle of the above described processing step is executed repetitively.

If the calculated velocity value V is judged at step 312 to have reached the threshold value Vth, processing proceeds to step 314 and the timer T is stopped. At step 316, a signal for turning on the transistor 1031 is outputted to start the ignition device 1004 for the driver's seat inflator.

Figure 19:
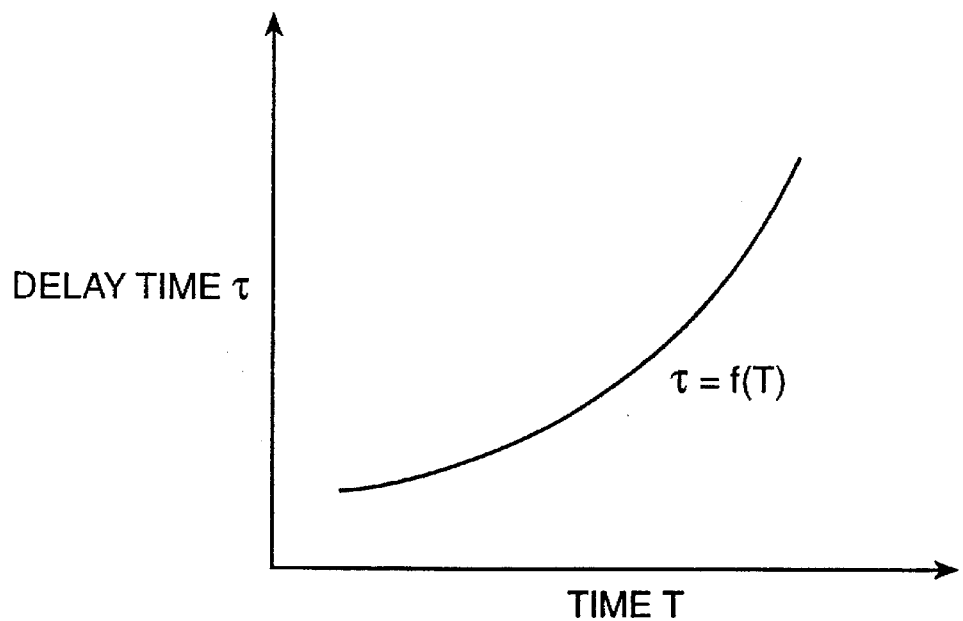
FIG. 19 is a characteristic diagram illustrating operation of the third embodiment apparatus.

Subsequently at step 318, a function value of measured time τ=f(T) is calculated. This function is stored beforehand in the EEPROM 1093 as a map. After a wait of the delay time τ at step 320, a signal for turning on the transistor 1032 is outputted at step 322 in order to start the ignition device 1005 for the passenger's seat inflator. The present program is thus finished. This function τ=f(T) has such a characteristic as to increase with time T as shown in FIG. 19, for example.

Figure 17:
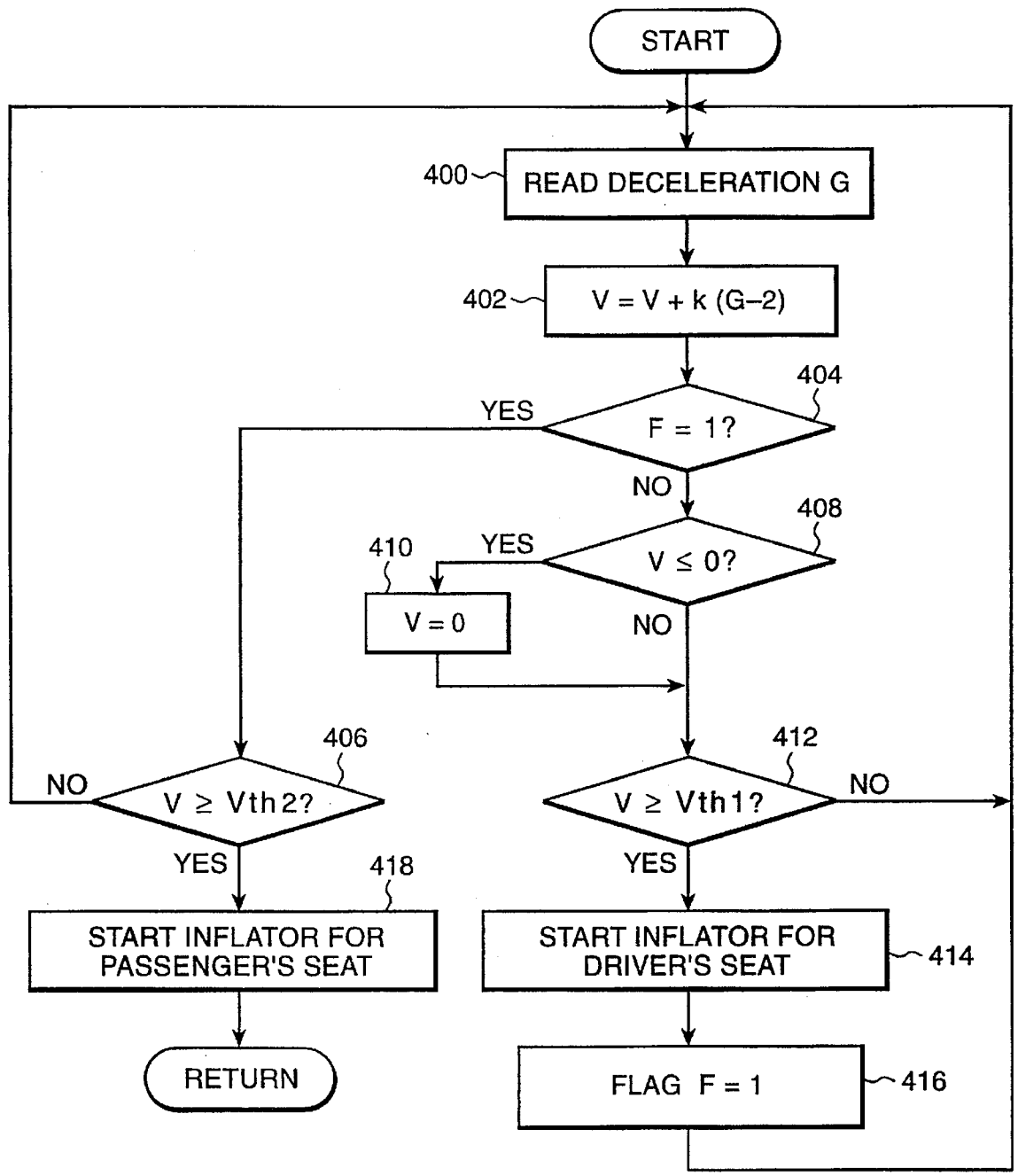
FIG. 17 is a flow chart showing the processing procedure of a CPU in a fourth embodiment apparatus.
Figure 18:
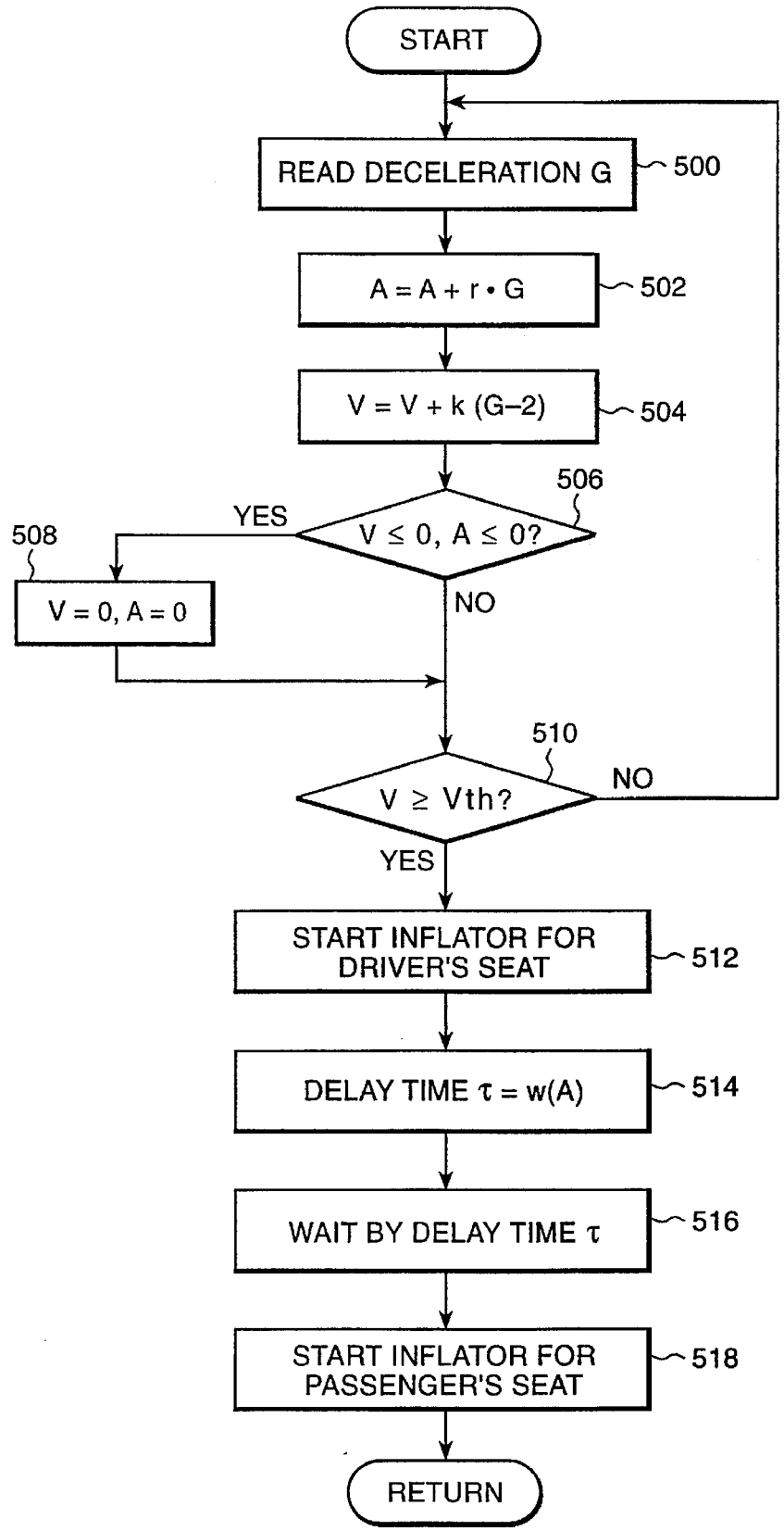
FIG. 18 is a flow chart showing processing procedure of a CPU in a fifth embodiment apparatus.

In a fourth embodiment shown in FIG. 17, there are separately provided a threshold value Vth1 for determining the start time of the driver's seat inflator and a threshold value Vth2 for determining the start time of the passenger's seat inflator. By making the threshold value Vth2 greater than the threshold value Vth1, the start time of the inflator for the passenger's seat is delayed as compared with the start time of the inflator for the driver's seat.

The processing procedure of the CPU 1091 is shown in FIG. 17. Steps 400, 402, 408 and 410 are processing procedures respectively identical with those of corresponding steps of the third embodiment, and are processing steps for calculating the calculated velocity value from deceleration G. If the calculated velocity value V is judged at step 412 to have reached the threshold value Vth1, a signal for turning on the transistor 1031 is outputted at step 414 in order to start the ignition device 1004 for the driver's seat inflator. Then at step 416, the flag F is set equal to a logic 1 in order to store the fact that the inflator for the driver's seat has been started. Processing returns to step 400 and the above-described processing is executed repetitively.

If the flag is a logic 1 at step 404, the ignition device 1004 for the driver's seat inflator has already been started. Without making a start decision of the ignition device 1004 for the driver's seat inflator, therefore, processing proceeds to step 406. At step 406, it is determined whether the calculated velocity value V has reached the threshold value Vth2. If the calculated velocity value V has not yet reached the threshold value Vth2 at step 406, processing proceeds to step 400, and the next control cycle of the above described processing step is executed repetitively. If the calculated velocity value V has already reached the threshold value Vth2, a signal for turning on the transistor 1032 is outputted at step 418 in order to start the ignition device 1005 for the passenger's seat inflator. The present program is thus finished.

A fifth embodiment is implemented by making the delay time of start of the passenger's seat inflator equivalent to a value depending upon the second velocity integral value at the start time of the driver's seat inflator.

Steps 500, 504, 506, 508, 510 and 512 are identical with corresponding steps of the third embodiment, respectively. When the calculated velocity value V has reached the threshold value Vth, the ignition device 1004 for the driver's seat inflator is started. On the other hand, start of the ignition device 1005 for the passenger's seat inflator is ordered as described below.

At step 502, the second calculated velocity value A is calculated. The calculated velocity value V is an integral value of deviation of deceleration G from the threshold value 2 g, whereas the second calculated velocity value A is an integral value of deceleration G. The second calculated velocity value A is an integral value of deceleration G provided with no offset.

Figure 20:
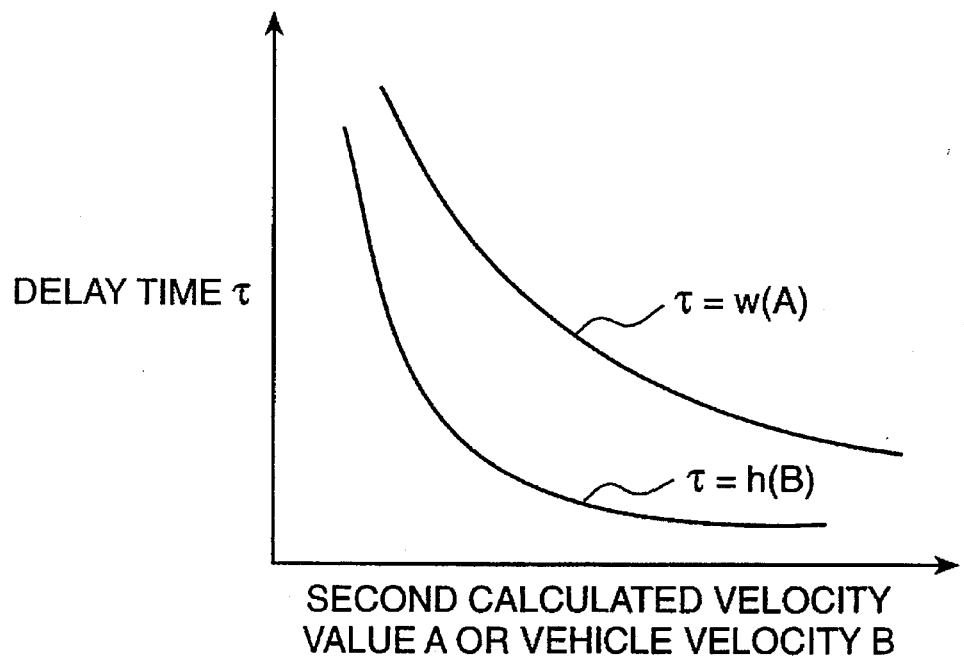
FIG. 20 is a diagram illustrating the operation of the fifth embodiment apparatus and the sixth embodiment apparatus.

After the inflator for the driver's seat has been started, the delay time τ is determined at step 514 by a function w(A) of the second calculated velocity value A. After a wait of the delay time τ at step 516, a signal for turning on the transistor 1032 is outputted at step 518 in order to start the ignition device 1005 for the passenger's seat inflator. This function w(A) has such a characteristic as to decrease in inverse proportion to the second calculated velocity value A as shown in FIG. 20, for example.

In a sixth embodiment, the delay time for starting the inflator of the passenger's seat is determined to be τ=h(B) depending upon the velocity B of the vehicle at the time of a collision unlike the first embodiment. The vehicle velocity B is read from a vehicle velocity sensor mounted on the vehicle at step 304, and the delay time τ is determined at step 318 By the relation τ=h(B) on the basis of the vehicle velocity B. This function h(B) has such a characteristic as to decrease in inverse proportion to the vehicle velocity B as shown in FIG. 20, for example.

In all of the above described embodiments, the physical displacement value of the vehicle based upon the deceleration signal supplied from the acceleration sensor 15 may be a calculated displacement value obtained by integrating the deceleration signal twice instead of the above described calculated velocity value V. At this time, a value corresponding to the calculated displacement value is used as the threshold value at each step.

Furthermore, the displacement value may be an energy value obtained by squaring the calculated velocity value V. At this time, a value corresponding to the energy value is used as the threshold value.

In the above described third through sixth embodiments, steps 300, 400 and 500 are deceleration reading means, step 302 is the threshold decision means, steps 306, 402 and 504 are calculated velocity value calculation means, step 502 is the second calculated velocity value calculation means, steps 312, 412 and 510 are first threshold decision means, step 318 is the second threshold decision means, and steps 316, 322, 414, 512 and 518 are inflator start ordering means.

An air bag system for the passenger's seat is disclosed in U.S. Pat. No. 5,149,127, which is incorporated herein by reference.

Preferably, the air bag controlling apparatus of each embodiment is applied to the air bag system now mounted on motor vehicles (with the registered trademark MINICA) manufactured by Mitsubishi Motors Corporation.

While the present invention has been described in detail, it should be understood that various changes, substitutions and alterations can be made hereto without departing from the spirit and scope of the present invention as defined by the appended claims.

We claim:

1. An air bag controlling apparatus for controlling inflation of an air bag, comprising:

a sensor for detecting deceleration of a vehicle;

an inflator for discharging gas into said air bag;

first calculation means for integrating said detected deceleration with respect to time and for calculating a first velocity change value, said first calculation means providing said deceleration with a plus or minus sign with reference to a first deceleration reference value;

second calculation means for integrating said detected deceleration with respect to time and thereby calculating a second velocity change value, said second calculation means providing said deceleration with a plus or minus sign with reference to a second deceleration reference value greater than said first deceleration reference value;

a first memory device preserving a first velocity threshold value for said first velocity change value;

a second memory device preserving a second velocity threshold value for said second velocity change value;

ignition means for comparing said first velocity change value with said first velocity threshold value, for comparing said second velocity change value with said second velocity threshold value, and for igniting said inflator when said first velocity change value has reached said first velocity threshold value and said second velocity change value has reached said second velocity threshold value; and threshold value updating means for increasing said second velocity threshold value when the time elapsed since said first velocity change value has become positive is within a first time reference value and said first velocity change value does not reach said first velocity threshold value.

2. An air bag controlling apparatus according to claim 1, wherein said first velocity reference value is equal to said first velocity threshold value.

3. An air bag controlling apparatus according to claim 2, wherein said first time reference value is substantially 6 ms.

4. An air bag controlling apparatus according to claim 1, further comprising:

means for comparing said first velocity change value with said second velocity change value; and said threshold value updating means making said second velocity threshold value larger when a result of comparison made by said comparing means meets a predetermined condition.

5. An air bag controlling apparatus according to claim 4, wherein said comparing means calculates a ratio between said first velocity change value and said second velocity change value.

6. An air bag controlling apparatus according to claim 1, further comprising:

means for prohibiting operation of said ignition means and resetting elapsed time, said calculated first velocity change value and said calculated second velocity change value, when the time elapsed since said first velocity change value became positive has exceeded a second time reference value.

7. An air bag controlling apparatus according to claim 6, wherein said second time reference value is substantially 120 ms.

8. An air bag controlling apparatus according to claim 1, further comprising:

means for prohibiting operation of said ignition means until the time elapsed since said first velocity change value became positive reaches a third time reference value.

9. An air bag controlling apparatus according to claim 8, wherein said third time reference value is substantially equal to said first time reference value.

10. An air bag controlling apparatus according to claim 9, wherein said third time reference value is substantially 6 ms.

11. An air bag controlling apparatus according to claim 8, further comprising:

means for prohibiting operation of said ignition means and resetting elapsed time, said calculated first velocity change value and said calculated second velocity change value, when the time elapsed since said first velocity change value became positive is less than a fourth time reference value and said second velocity change value has exceeded said second velocity threshold value, and said fourth time reference value is less than the third time reference value.

12. An air bag controlling apparatus according to claim 11, wherein said fourth time reference value is substantially 2 ms.

13. An air bag controlling apparatus according to claim 11:

where said means for prohibiting operation of said ignition means and resetting elapsed time, said calculated first velocity change value and said calculated second velocity change value, is activated when said detected deceleration is less than a third deceleration reference value and has exceeded a fifth time reference value.

14. An air bag controlling apparatus according to claim 13, wherein said third deceleration reference value is substantially −2 g and said fifth time reference value is substantially 7.5 ms.

15. An air bag assembly comprising: an air bag;
a sensor for detecting deceleration of a vehicle;
an inflator for discharging gas into said air bag;
first calculation means for integrating said detected deceleration with respect to time and thereby calculating a first velocity change value, in integrating said deceleration said first calculation means providing said deceleration with a plus or minus sign with reference to a first deceleration reference value;
second calculation means for integrating said detected deceleration with respect to time and thereby calculating a second velocity change value, in integrating said deceleration said second calculation means providing said deceleration with a plus or minus sign with reference to a second deceleration reference value greater than said first deceleration reference value;
a first memory device preserving a first velocity threshold value for said first velocity change value;
a second memory device preserving a second velocity threshold value for said second velocity change value;
ignition means for comparing said first velocity change value with said first velocity threshold value, comparing said second velocity change value with said second velocity threshold value, and igniting said inflator when said first velocity change value has reached said first velocity threshold value and said second velocity change value has reached said second velocity threshold value; and
threshold value updating means for making said second velocity threshold value larger when time elapsed since said first velocity change value has become positive is within a first time reference value and said first velocity change value does not reach said first velocity threshold value.

16. A method for controlling the inflation of an air bag, comprising the steps of:

detecting deceleration of a vehicle;
performing a first calculation step of integrating said detected deceleration with respect to time and thereby calculating a first velocity change value, said first calculation step comprising providing said deceleration with a plus or minus sign with reference to a first deceleration reference value when integrating said deceleration;
performing a second calculation step of integrating said detected deceleration with respect to time and thereby calculating a second velocity change value, said second calculation step comprising providing said deceleration with a plus or minus sign with reference to a second deceleration reference value greater than said first deceleration reference value when integrating said deceleration;
performing a step of comparing said first velocity change value with a first velocity threshold value, comparing said second velocity change value with a second velocity threshold value, and igniting an inflator to discharge gas into said air bag when said first velocity change value has reached said first velocity threshold value and said second velocity change value has reached said second velocity threshold value; and
performing a threshold value updating step of making said second velocity threshold value larger when the time elapsed since said first velocity change value has become positive is within a first time reference value and said first velocity change value does not reach said first velocity threshold value.

17. An air bag controlling apparatus for controlling inflation of an air bag, comprising:

a sensor for detecting deceleration of a vehicle and generating a deceleration signal;
an inflator for discharging gas into said air bag;
first means for processing said deceleration signal to derive a first displacement value;
second means for processing said deceleration signal to derive a second displacement value;
a first memory device preserving a first displacement threshold value for said first displacement value;
a second memory device preserving a second displacement threshold value for said second displacement value;
ignition means for comparing said first displacement value with said first displacement threshold value, comparing said second displacement value with said second displacement threshold value, and igniting said inflator when said first displacement value has reached said first displacement threshold value and said second displacement value has reached said second displacement threshold value; and
threshold value updating means for making said second displacement threshold value larger when the time elapsed since said first displacement value has become positive is within a first time reference value and said first displacement value does not reach said first displacement threshold value.

* * * * *